Patented May 16, 1950

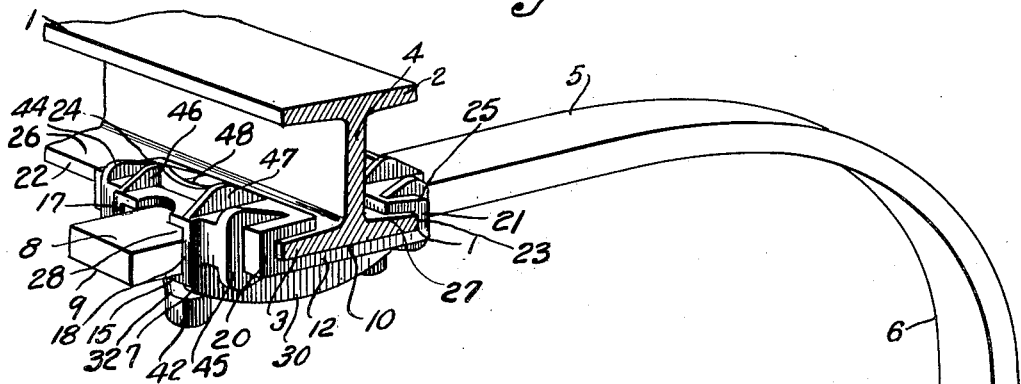
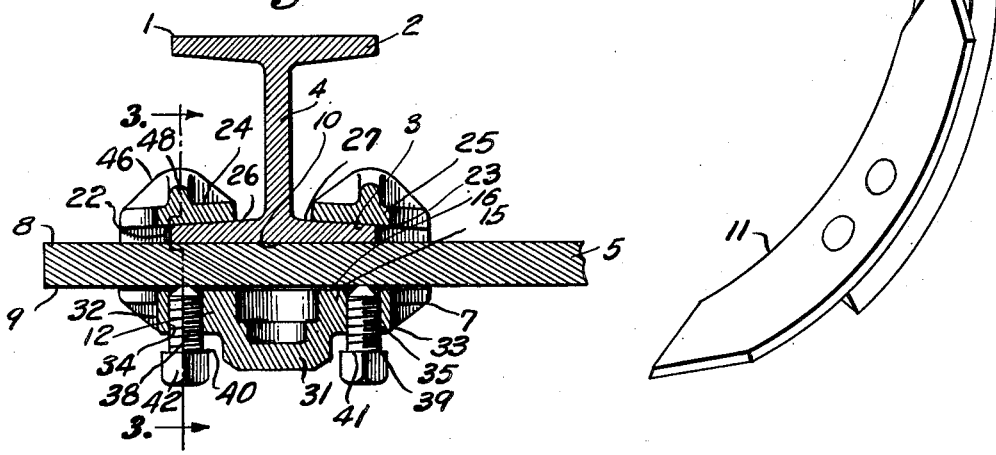
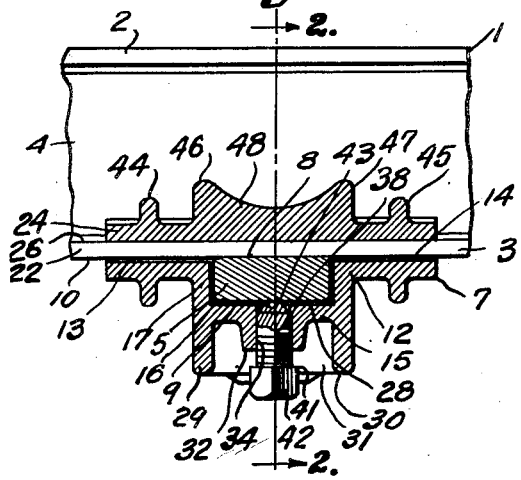

2,507,783

UNITED STATES PATENT OFFICE 2,507,783

CLAMP

William T. Graham, Amarillo, Tex.

Application February 26, 1947, Serial No. 730,992

5 Claims. (Cl. 248—228)

This invention relates to a ground working machine and more particularly to mounting of the resilient shank of a ground working tool to the supporting member or frame of the machine.

The principal object of the invention is to provide a shank mounting that anchors the ground working tool on its supporting member and prevents displacement under draft forces and vibratory action of the ground working tool.

Other objects of the invention are to provide a clamp constructed to engage the lower flange of an I-shaped frame member and to firmly retain the resilient shank of the ground working tool in frictional contact with the face of the flange; to provide a clamp having a shape to prevent lateral rocking movement of the clamp on the shank of the tool; and to provide a clamp having a shape which avoids distortion and bending thereof under forces applied through the ground working tool.

It is also an object of the invention to provide the clamp with substantially widely spaced anchoring screws acting in conjunction with overlying jaws of the clamp to apply the clamping pressure upon the outer marginal edges of the lower flange of the supporting member.

In accomplishing these and other objects of the invention hereinafter pointed out, I have provided improved structure, the preferred form of which is illustrated in the accompanying drawing wherein:

Fig. 1 is a sectional perspective view of a portion of the frame of a ground working machine and illustrating application of a clamp constructed in accordance with the present invention for anchoring the shank of a ground working tool.

Fig. 2 is a section on the line 2—2 of Fig. 3, particularly illustrating clamping contact of the shank with the lower flange of the supporting member of the frame.

Fig. 3 is a cross section on the line 3—3 of Fig. 2.

Fig. 4 is a perspective view of a modified form of the clamp construction which facilitates mounting of the clamp on an assembled plow frame where the clamp cannot be slid onto the end of the supporting member.

Referring more in detail to the drawings:

1 designates a tool supporting member or portion of the frame of a ground working machine. The supporting member is illustrated in the drawing as comprising an I-beam arranged with the flanges 2 and 3 extending substantially horizontally and the web 4 in a vertical position with the beam extending transversely of the line of draft for attaching the shank 5 of a ground working tool 6 by means of a clamp 7 in accordance with the present invention.

In the illustrated instance the shank 5 is of rectangular cross section and has substantially flat upper and lower faces 8 and 9 with the upper face extending transversely across the underface 10 of the lower flange 3. The forward end of the shank terminates slightly in front of the beam and the rear portion of the shank curves downwardly and forwardly to mount the ground working blade 11 which may be of suitable shape.

The clamp 7 includes a plate-like body portion 12 of sufficient length to extend across the face 10 of the flange 3 and of greater width than the width of the resilient shank 8 to provide substantially flat faces 13 and 14 (Figs. 3 and 4) adapted to closely underlie the face 10 on the respective sides of the shank 5. The body portion of the clamp also includes a down set web portion 15 having an upper clamping face 16 corresponding in width to the shank 5 and which is of somewhat longer length than the faces 13 and 14. The web portion 15 is connected with the plate portions of the clamp by vertical webs 17 and 18. Extending upwardly from the plate portions of the clamp at the ends of the faces 13 and 14 and projecting laterally from the vertical webs 17 and 18 are webs 20 and 21 extending along the edge faces 22 and 23 of the flange 3 and which terminate in inwardly extending clamping flanges 24 and 25 that engage the upper faces 26 and 27 of the flange 3. The clamping flanges 24 and 25 extend across the space between the vertical webs 17 and 18 to interconnect and brace the vertical webs. The vertical webs 17 and 18 thus cooperate with the bottom web portion 15 to provide a longitudinal channel 28 open at the ends to pass the shank 8 therethrough so that when the lower face 9 of the shank is resting upon the face 16 of the web 15, the upper face 8 lies substantially within the plane of faces 13 and 14 as best shown in Fig. 3.

In order to reinforce the body portion of the clamp the webs 17 and 18 depend below the web portion 15 to form spaced parallel arcuate ribs 29 and 30 that are interconnected at the centers thereof by a depending internally hollowed boss 31, the hollow portion of which opens inwardly through the face 16 of the web 15 as shown in Fig. 2. Extending from opposite diametrical sides of the boss 31 and depending from the web 15 adjacent the ends of the arcuate webs 29 and 30 are bosses 32 and 33 having internally threaded openings 34 and 35 with the axes thereof registering with the marginal edges of the lower flange 3 of the supporting member 1 as shown in Figs. 2 and 3. Turned into the threaded openings are shanks 38 and 39 of set screws 40 and 41, the set screws being provided with polygonal-shaped heads 42 by which the shanks are turned into the threaded openings by means of a suitable wrench (not shown). The terminal ends of the threaded shanks of the screws are preferably coned and recessed as at 43 to provide circular ridges for contacting the underface of the shank 5. The webs 22 and 21 and clamping flanges 24 and 25 are reinforced by external ribs 44 and 45 adjacent the respective ends of the clamp and the clamping flanges 24 and 25 are additionally reinforced over the set screws by ribs 46 and 47 projecting upwardly from the webs 17 and 18 and which are interconnected by ribs 48.

In applying the clamp it is passed over the flange 3 at one end of the beam and shifted therealong to its desired position with the clamping flanges 24 and 25 resting upon the upper faces 26 and 27 of the beam flange. The shank 5 is then passed through the channel-shaped socket 28 so that the end projects therefrom in the forward direction of the machine. The set screws 40 and 41 are then applied and tightened to draw the clamping flanges 24 and 25 into clamping contact with the upper faces 26 and 27 of the flange 3 and the upper face 8 of the shank 5 into clamping contact with the underface 10 of the flange 3. The set screws may draw the faces 13 and 14 of the plate portion of the clamp slightly out of contact with the underface of the beam, however, the faces are sufficiently close to provide stop engagement therewith and prevent permanent bending or distortion that would ordinarily tend to release the clamp. The set screws are applied so that the pressure points are spread the maximum distance across the width of the flange to reinforce the flange 3 and avoid bending thereof incidental to constant pumping or vibratory action of the ground working tool or should the ground working tool strike a rock or other object when the machine is in operation.

Fig. 4 illustrates the modification of the invention wherein the clamp is split longitudinally midway of the plate portion 12 to facilitate application of the clamp when the structure of the plow frame is such that it is inconvenient to slide the clamps onto the ends of the I-beams. In this form of the invention each section is provided with ears 50 and 51 depending from the plate portion and which are adapted to be clamped together by fastening devices such as bolts 52. An applying this form of the invention the bolts 52 are removed and the parts of the clamp are engaged over the lower flange of the I-beam at the point where they are to be mounted. The fastening devices 52 are then inserted to secure the parts in position after which the shank 8 is inserted through the passageway 28 and the set screws 42 are tightened as previously described in connection with the form of clamp shown in Figs. 1 to 3 inclusive.

From the foregoing it is obvious that I have provided a mounting for the shank of a ground working tool which is of strong, rigid construction and which securely anchors the shank of the tool so as to reinforce the clamp and attaching portion of the supporting beam and thereby prevent permanent distortion of the parts.

What I claim and desire to secure by Letters Patent is:

1. A clamp for attaching the shank of a ground working tool to the flange of an I-beam member including a plate portion having face portions spaced apart in the longitudinal direction of the I-beam member and corresponding to a face of the I-beam flange and having an intermediate portion downset from said face portions and within the space therebetween to accommodate the shank therein and under said face of the I-beam flange, clamping flanges extending transversely across said laterally spaced face portions in bridging relation with the space therebetween and spaced from said face portions to accommodate the I-beam flange therebetween, and means extending through said plate portion and adapted to engage the shank for drawing the clamping flanges into contact with opposite faces of the I-beam flange and the shank into contact with said first mentioned face of the I-beam flange.

2. A clamp for attaching the shank of a ground working tool to the flange of an I-beam member including a plate portion having face portions spaced apart in the longitudinal direction of the I-beam member and corresponding to a face of the I-beam flange and having an intermediate portion downset from said face portions and within the space therebetween to accommodate the shank therein and under said face of the I-beam flange, clamping flanges extending transversely across said laterally spaced face portions in bridging relation with the space therebetween and spaced from said face portions to accommodate the I-beam flange therebetween, and set screws threadedly carried by said intermediate portion of the plate portion of the clamp and adapted to engage the shank for drawing the clamping flanges into contact with opposite faces of the I-beam flange and to move the shank into clamping contact with said first mentioned face of the I-beam flange.

3. A clamp for attaching the shank of a ground working tool to the flange of an I-beam member including a plate portion having face portions spaced apart in the longitudinal direction of the I-beam member and corresponding to a face of the I-beam flange and having an intermediate portion downset from said face portions and within the space therebetween to accommodate the shank therein and under said face of the I-beam flange, clamping flanges extending transversely across said face portions in bridging relation with the space therebetween and spaced from said face portions to accommodate the flange of the I-beam therebetween and for engaging opposite faces of the I-beam flange, laterally spaced ribs depending from said intermediate portion, a boss interconnecting the ribs, bosses depending from said intermediate portion on opposite sides of the boss in the longitudinal direction of the shank, and set screws threaded into said last named bosses for drawing the clamping flanges and shank into clamping engagement with said flange face of the I-beam.

4. A clamp for attaching the shank of a ground working tool to the flange of an I-beam member including a plate portion having face portions spaced apart in the longitudinal direction of the I-beam member and corresponding to a face of the I-beam flange and having an intermediate portion downset from said face portions and within the space therebetween to accommodate the shank therein and under said face of the I-beam flange, clamping flanges extending transversely across said laterally spaced face portions in bridging relation with the space therebetween and spaced from said face portions to accommodate the I-beam flange therebetween, means for drawing the clamping flanges into contact with opposite faces of the I-beam flange and the shank into contact with said first mentioned face of the I-beam flange, said plate portion being divided intermediate said clamping flanges, ears on said plate portion at the respective sides of the division, and fastening devices extending through said ears.

5. A clamp for attaching the shank of a ground working tool to the flange of an I-beam member including a plate portion having face portions spaced apart in the longitudinal direction of the I-beam member and corresponding to a face of the I-beam flange and having an intermediate portion downset from said face portions and within the space therebetween to accommodate the shank therein under said face of the I-beam flange, clamping flanges extending transversely across said laterally spaced face portions in bridging relation with the space therebetween and spaced from said face portion to accommodate the I-beam flange therebetween, set screws threadedly carried by said intermediate portion of the plate portion of the clamp and adapted to engage the shank for drawing the clamping flanges into contact with opposite faces of the I-beam flange and to move the shank into clamping contact with said first mentioned face of the I-beam flange, said plate portion being divided intermediate said clamping flanges, ears on said plate portion at the respective sides of the division, and fastening devices extending through said ears.

WILLIAM T. GRAHAM.

REFERENCES CITED

The following references are of record in the file of this patent:

UNITED STATES PATENTS

| Number | Name | Date |
|---|---|---|
| 1,642,170 | Rawson | Sept. 13, 1927 |
| 1,742,838 | Williams | Jan. 7, 1930 |
| 1,838,355 | Benjamin | Dec. 29, 1931 |
| 1,893,116 | Vowinkel | Jan. 3, 1933 |
| 2,029,249 | Noell et al. | Jan. 28, 1936 |